(12) United States Patent  
Pasupuleti et al.

(10) Patent No.: US 7,788,243 B2  
(45) Date of Patent: Aug. 31, 2010

(54) SYSTEM AND METHODS FOR OPTIMIZING DATA TRANSFER AMONG VARIOUS RESOURCES IN A DISTRIBUTED ENVIRONMENT

(75) Inventors: Kantikiran Krishna Pasupuleti, Visakhapatnam (IN); Vaibhav A. Nalawade, Pune (IN); Vadiraja P. Bhatt, Bangalore (IN)

(73) Assignee: Sybase, Inc., Dublin, CA (US)

( * ) Notice: Subject to any disclaimer, the term of this patent is extended or adjusted under 35 U.S.C. 154(b) by 424 days.

(21) Appl. No.: 11/675,323

(22) Filed: Feb. 15, 2007

(65) Prior Publication Data

US 2008/0065644 A1 Mar. 13, 2008

Related U.S. Application Data

(60) Provisional application No. 60/767,575, filed on Sep. 8, 2006.

(51) Int. Cl.  
*G06F 17/30* (2006.01)

(52) U.S. Cl. .................. 707/704; 711/167; 709/214

(58) Field of Classification Search .................. 707/8, 707/10, 203, 2, 200, 205, 625, 638, 639, 707/655, 656, 657, 687, 695, 704, 737; 711/118, 711/122, 129, 137, 203, 100, 167; 709/201, 709/203, 213, 214  
See application file for complete search history.

(56) References Cited

U.S. PATENT DOCUMENTS 5,327,556 A * 7/1994 Mohan et al. .................. 707/8  
5,574,902 A * 11/1996 Josten et al. .................. 707/1  
5,761,660 A * 6/1998 Josten et al. .................. 707/8

(Continued)

OTHER PUBLICATIONS

Seznec, A., Concurrent Support of Multiple Page Sizes on a Skewed Associative TLB, Computers, IEEE Trans, vol. 53, Issue 7, Jul. 2004, pp. 924-927.*

(Continued)

*Primary Examiner*—Greta L Robinson  
(74) *Attorney, Agent, or Firm*—John A. Smart; G. Mack Riddle

(57) ABSTRACT

System providing methodology for optimizing data transfer in a distributed environment is described. In one embodiment, for example, in a distributed shared disk cluster environment comprises a plurality of nodes, each node storing database pages in different size buffer pools configured for local access and configured independent from other nodes in the cluster, the database pages residing at any buffer pool across nodes without requiring that a page be present at an identical buffer pool at all nodes in the cluster, a method of the present invention for transferring database pages among nodes comprises: generating a request at a first node for a set of database pages, the request including a timestamp for determining what are latest versions of the database pages; in response to the request, determining where latest versions of the database pages of the set reside among the plurality of nodes without regard to what size of buffer pool any given database page may reside in; if the database pages of the set reside among the plurality of nodes, initiating transfer of particular database pages to the first node as required for providing the first node with the latest versions of the database pages; and, otherwise if the database pages of the set do not reside among the plurality of nodes, instructing the first node to fetch the database pages from disk.

42 Claims, 12 Drawing Sheets

U.S. PATENT DOCUMENTS

| | | |
|---|---|---|
| 6,098,096 A | 8/2000 | Tsirigotis et al. |
| 6,275,916 B1 | 8/2001 | Weldon et al. |
| 6,370,619 B1 | 4/2002 | Ho et al. |
| 6,389,513 B1 | 5/2002 | Closson |
| 6,446,070 B1 | 9/2002 | Arnold et al. |
| 6,463,509 B1 | 10/2002 | Teoman et al. |
| 6,466,947 B2 | 10/2002 | Arnold et al. |
| 6,470,360 B1 | 10/2002 | Vaitheeswaran |
| 6,470,422 B2 | 10/2002 | Cai et al. |
| 6,480,936 B1 | 11/2002 | Ban et al. |
| 6,490,670 B1 | 12/2002 | Collins et al. |
| 6,564,230 B2 | 5/2003 | Bamford et al. |
| 6,591,346 B1 | 7/2003 | Kottapurath |
| 6,591,347 B2 | 7/2003 | Tischler et al. |
| 6,598,094 B1 | 7/2003 | Wollrath et al. |
| 6,598,119 B2 | 7/2003 | Becker et al. |
| 6,609,126 B1 | 8/2003 | Smith et al. |
| 6,631,446 B1 | 10/2003 | Cherkauer et al. |
| 6,633,862 B2 | 10/2003 | Thompson |
| 6,643,650 B1 | 11/2003 | Slaughter et al. |
| 6,662,196 B2 | 12/2003 | Holenstein et al. |
| 6,701,359 B1 | 3/2004 | Calabrez et al. |
| 6,704,756 B2 | 3/2004 | Wollrath et al. |
| 6,718,349 B2 | 4/2004 | Weedon |
| 6,728,726 B1 | 4/2004 | Bernstein et al. |
| 6,728,840 B1 | 4/2004 | Shatil et al. |
| 6,741,997 B1 | 5/2004 | Liu et al. |
| 6,769,048 B2 | 7/2004 | Goldberg et al. |
| 6,789,170 B1 | 9/2004 | Jacobs et al. |
| 6,792,436 B1 | 9/2004 | Zhu et al. |
| 6,829,680 B1 | 12/2004 | Sugumar et al. |
| 6,836,774 B2 | 12/2004 | Melbin |
| 6,848,028 B1 | 1/2005 | Sugumar et al. |
| 6,877,066 B2 | 4/2005 | Benfield et al. |
| 6,898,603 B1 | 5/2005 | Petculescu et al. |
| 6,917,976 B1 | 7/2005 | Slaughter et al. |
| 6,944,711 B2 | 9/2005 | Mogi et al. |
| 6,957,427 B1 | 10/2005 | Wollrath et al. |
| 6,973,493 B1 | 12/2005 | Slaughter et al. |
| 7,035,990 B1 | 4/2006 | Muhlbauer |
| 7,103,586 B2 | 9/2006 | Holenstein et al. |
| 7,117,535 B1 | 10/2006 | Wecker |
| 7,124,249 B1 | 10/2006 | Darcy |
| 7,188,251 B1 | 3/2007 | Slaughter et al. |
| 7,210,148 B2 | 4/2007 | Arnold et al. |
| 7,222,117 B1 | 5/2007 | McGrogan |
| 7,243,356 B1 | 7/2007 | Saulpaugh et al. |
| 7,296,275 B2 | 11/2007 | Colley et al. |
| 7,421,562 B2 | 9/2008 | Bhatt et al. |
| 7,444,644 B1 | 10/2008 | Slaughter et al. |
| 7,457,796 B2 * | 11/2008 | Lashley et al. ............. 707/2 |
| 2005/0289189 A1 * | 12/2005 | Nettleton et al. ........... 707/200 |
| 2006/0074970 A1 * | 4/2006 | Narayanan et al. ......... 707/102 |

OTHER PUBLICATIONS

Lomet et al., Using the Lock Manager to Choose Timestamps, Database Engineering and Application Symposium, 2005, Ideas 2005, 9th International, Jul. 25-27, 2005, pp. 357-368.*

Ohn et al., Prototyping PHLOX, A High Performance Transaction Processing Cluster with Shared Disks, Distributed Computing Systems, 2001. FTDCS 2001. Proceedings. The Eighth IEEE Workshop on Oct. 31-Nov. 2001, pp. 67-73.*

* cited by examiner

MASS

| | | PG ID = #4 | | | | |
|---|---|---|---|---|---|---|

↑
bp

SIZE 16K = 8 PAGES

*FIG. 4*

SYSTEM AND METHODS FOR OPTIMIZING DATA TRANSFER AMONG VARIOUS RESOURCES IN A DISTRIBUTED ENVIRONMENT

CROSS REFERENCE TO RELATED APPLICATIONS

The present application is related to and claims the benefit of priority of the following commonly-owned, presently-pending provisional application(s): application Ser. No. 60/767,575, filed Sep. 8, 2006, entitled "System and Methods For Optimizing Data Transfer Among Various Resources In A Distributed Environment", of which the present application is a non-provisional application thereof. The present application is related to the following commonly-owned, presently-pending application(s): application Ser. No. 11/309,940, filed Nov. 10, 2006, entitled "Replication System with Methodology for Replicating Database Sequences". The disclosures of each of the foregoing applications are hereby incorporated by reference in their entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e):

This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 34941 Bytes, created: Sep. 8, 2006 1:49:12 PM; Object ID: File No. 1; Object Contents: Source code.

BACKGROUND OF INVENTION

1. Field of the Invention

The present invention relates generally to data processing and, more particularly, to optimizing data transfer among various resources in a distributed environment.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

Databases add data to and retrieve data from mass storage devices during normal operation. Such storage devices are typically mechanical devices such as disks or tape drives which transfer data rather slowly, thus impacting database access of information. To speed up the access process, databases employ a "buffer cache" which is a section of relatively faster memory (e.g., RAM) allocated to store recently used data objects. This faster memory (simply be referred to as "memory," as distinguished from mass storage devices such as disks) is typically provided on semiconductor or other electrical storage media and is coupled to the CPU via a fast data bus. Because the transfer of data in memory is governed by electronic rather than mechanical operations, the data stored on the memory can be accessed much more rapidly than data stored on disks.

In recent years, users have demanded that database systems be continuously available, with no downtime, as they are frequently running applications that are critical to business operations. In response, distributed database systems have been introduced to provide for greater reliability. More recently, "Shared Disk Cluster" database systems have been introduced to provide increased reliability and scalability. A "Shared Disk Cluster" (or "SDC") database system is a system that has a cluster of two or more database servers having shared access to a database on disk storage. The term "cluster" refers to the fact that these systems involve a plurality of networked server nodes which are clustered together to function as a single system. Each node in the cluster usually contains its own CPU and memory and all nodes in the cluster communicate with each other, typically through private interconnects. "Shared disk" refers to the fact that two or more database servers share access to the same disk image of the database. Shared Disk Cluster database systems provide for transparent, continuous availability of the applications running on the cluster with instantaneous failover amongst servers in the cluster. When one server is down (e.g., for upgrading the CPU) the applications are able to continue to operate against the shared data using the remaining machines in the cluster, so that a continuously available solution is provided. Shared Disk Cluster systems also enable users to address scalability problems by simply adding additional machines to the cluster, without major data restructuring and the associated system downtime that is common in prior SMP (symmetric multiprocessor) environments.

In a distributed shared disk cluster environment, all nodes in the cluster have caches with only one buffer pool of a fixed size. The buffer pool size is the same as the database page size, and is the same across all instances in the cluster. However, that approach is not necessarily optimal for I/O operations involving large contiguous data, nor does the approach taken into account the local access patterns of a given node. Therefore, a better approach is sought.

What is needed is an approach for supporting multiple buffer pools in a cache in a distributed shared disk cluster environment, especially as there is a need in such an environment to handle data transfer among nodes efficiently. The approach should allow each of the nodes to be able to support independently configured buffer pools for caching the data. In that manner, buffer pools of sizes larger than the database page size can be configured within a cache. These pools can help read or write large contiguous data and help enhance I/O performance. The present invention fulfills this and other needs.

SUMMARY OF INVENTION

System providing methodology for optimizing data transfer in a distributed environment is described. In one embodiment, for example, in a distributed shared disk cluster environment comprises a plurality of nodes, each node storing database pages in different size buffer pools configured for local access and configured independent from other nodes in the cluster, the database pages residing at any buffer pool across nodes without requiring that a page be present at an identical buffer pool at all nodes in the cluster, a method of the present invention for transferring database pages among nodes comprises: generating a request at a first node for a set of database pages, the request including a timestamp for determining what are latest versions of the database pages; in response to the request, determining where latest versions of the database pages of the set reside among the plurality of nodes without regard to what size of buffer pool any given database page may reside in; if the database pages of the set reside among the plurality of nodes, initiating transfer of particular database pages to the first node as required for providing the first node with the latest versions of the database pages; and, otherwise if the database pages of the set do not reside among the plurality of nodes, instructing the first node to fetch the database pages from disk.

In another embodiment, for example, a distributed shared disk cluster system of the present invention is described that comprises: a plurality of nodes in the cluster, each node storing database pages in different size buffer pools configured for local access; a first node in the cluster that generates a request for a set of database pages, the request including a timestamp for determining what are latest versions of the database pages; and a lock manager that determines where latest versions of the database pages of the set reside among the plurality of nodes without regard to what size of buffer pool any given database page may reside, and which initiates transfer of particular database pages to the first node as required for providing the first node with the latest versions of the database pages.

In yet another embodiment, for example, in a distributed database environment, an improved method of the present invention is described for transferring database information, the method comprises steps of: storing the database information among a plurality of nodes, each node storing particular database information as database pages in different size buffer pools configured for local access; receiving a request from a requesting node for a set of database pages, the request including a timestamp for determining what are latest versions of the database pages; in response to the request, determining which nodes own latest versions of the database pages of the set; and if all of the database pages of the set are owned by nodes, transferring to the requesting node any database pages required for providing the requesting node with the latest versions.

BRIEF DESCRIPTION OF DRAWINGS

FIG. 4 is a block diagram illustrating a "MASS," which is simply a logical grouping of buffers of a particular size.

DETAILED DESCRIPTION

Glossary

Figure 1:
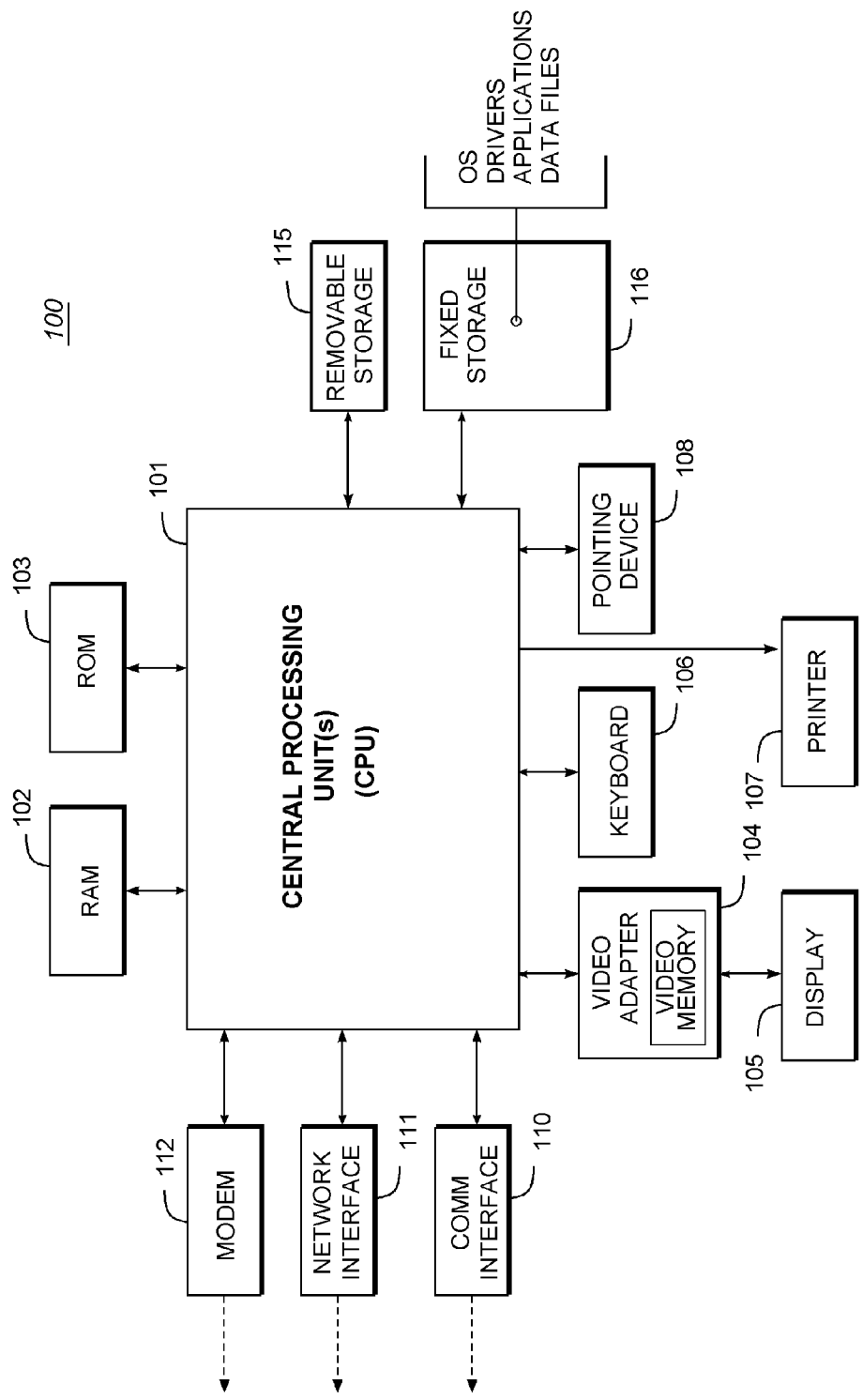
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

ASE: Sybase® Adaptive Server® Enterprise, an enterprise relational database system available from Sybase, Inc. of Dublin, Calif.

Buffer pool: A memory pool that holds a set of contiguous pages in a cache. A cache at a node comprises a set of buffer pools of various sizes.

Cache: A memory segment in the node that is used to store database pages (e.g., table pages, index pages, or the like). Requests for pages can be honored from memory, thereby avoiding disk access.

Nodes (instances): Refers to an instance of ASE server running on a host computer or an equivalent, as part of a cluster of similar servers running on the same/other computers.

Persistent storage (disk): Refers to any resource that stores persistent data to be accessed and is possibly slower than main memory.

Buffer: Refers to metadata information to maintain a page on disk in memory.

k: Abbreviation for kilobyte.

Page: Refers to the physical page on disk.

MASS: A set of buffers (1, 2, 4 or 8) of contiguous pages used for large I/Os.

SYBPAGESIZE: The size of the database page.

Physical lock: Locks maintained by the Cluster Lock Manager (CLM) to establish ownership of a page. These locks are Node specific and are held by a node as long as there are no conflicting requests in the cluster.

BAST: Short for blocking asynchronous transfer. In a case of conflicting lock request, the Cluster Lock Manager (CLM) provides a mechanism to notify the holder to release/downgrade the lock. This mechanism is a blocking call and is known as BAST.

AST: Short for asynchronous transfer. In case of a queued lock request, the Cluster Lock Manager (CLM) provides a mechanism to notify/wakeup the requester about the completion of lock request. This mechanism is asynchronous and is known as AST.

CLM: Cluster Lock Manager that performs lock management functions (e.g., granting exclusive or shared lock for a given database page).

BCM: Cluster Buffer Manager that performs memory management functions.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Microsoft Windows NT, Microsoft Windows 2000, Microsoft Windows XP, or Microsoft Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Client-Server Database Management System

Figure 2:
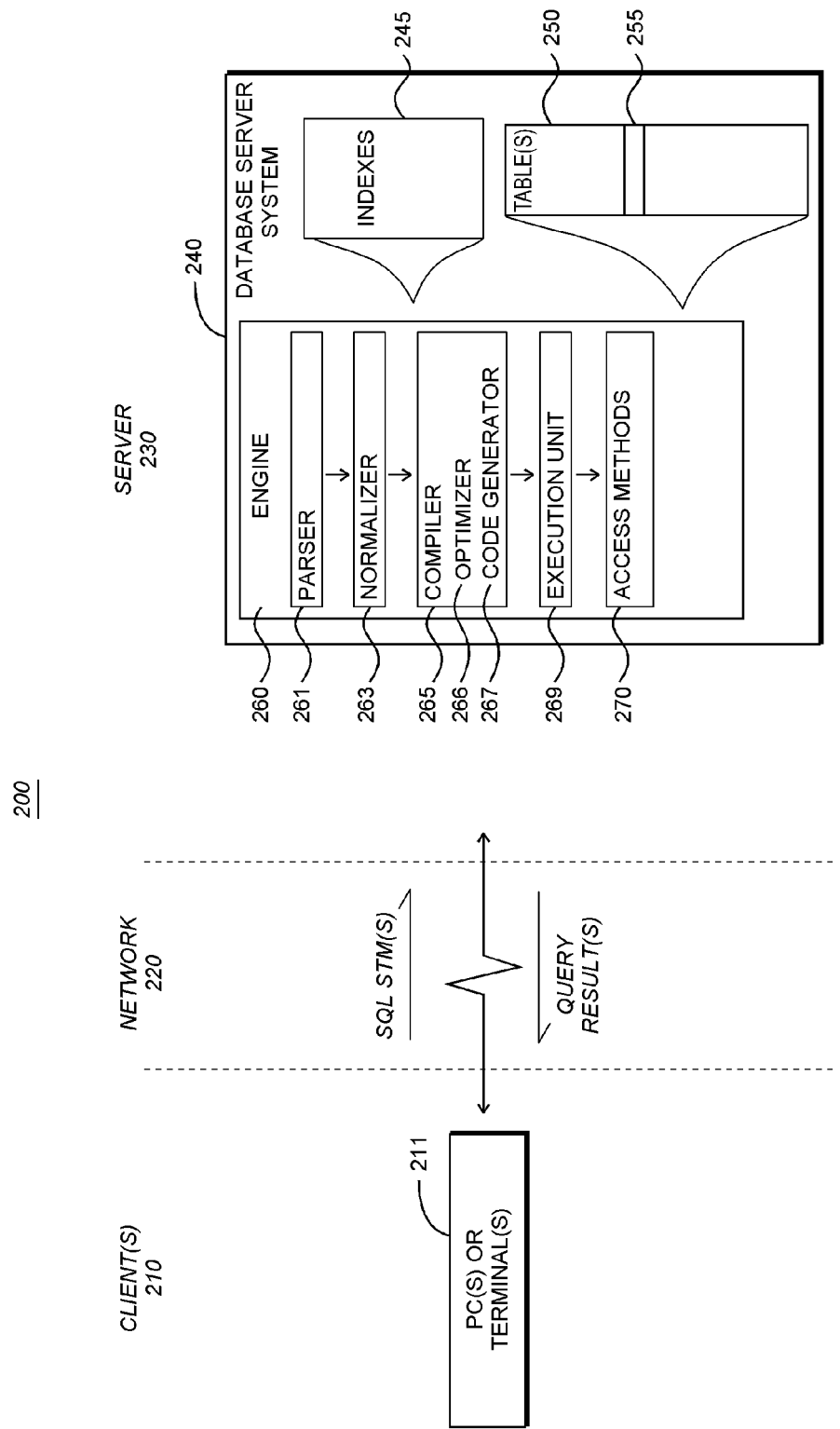
FIG. 2 is a block diagram illustrating the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 2 illustrates the general structure of a client/server database system 200 suitable for implementing the present invention. (Specific modifications to the system 200 for implementing methodologies of the present invention are described in subsequent sections below.) As shown, the system 200 comprises one or more client(s) 210 connected to a server 230 via a network 220. Specifically, the client(s) 210 comprise one or more standalone terminals 211 connected to a database server system 240 using a conventional network. In an exemplary embodiment, the terminals 211 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, or Windows XP).

The database server system 240, which comprises Sybase® Adaptive Server® Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Enterprise, see, e.g., "Adaptive Server Enterprise 15.0 Collection: (1) Core Documentation Set and (2) Installation and Configuration," available from Sybase, Inc. of Dublin, Calif. This product documentation is available via the Internet (e.g., currently at sybooks.sybase.com). The disclosures of the foregoing are hereby incorporated by reference.

In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and an access methods 270. Specifically, the SQL statements are passed to the parser 261 which converts the statements into a query tree—a binary tree data structure which represents the components of the query in a format selected for the convenience of the system. In this regard, the parser 261 employs conventional parsing methodology (e.g., recursive descent parsing).

The query tree is normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query tree is passed to the compiler 265, which includes an optimizer 266 and a code generator 267. The optimizer 266 is responsible for optimizing the query tree. The optimizer 266 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 267 translates the query execution plan selected by the query optimizer 266 into executable form for execution by the execution unit 269 using the access methods 270.

All data in a typical relational database system is stored in pages on a secondary storage device, usually a hard disk. Typically, these pages may range in size from 1 k (kilobyte) to 32 k (kilobyte), with the most common page sizes being 2 k and 4 k. For purposes of the description that follows, it will be assumed that the database page size is 2 k, although it can be one of 2 k, 4 k, 8 k and 16 k (and so forth). All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 230 maintains one or more database indexes 245 on the database tables 250. Indexes 245 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record, which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter "A".

The above-described computer hardware and software are presented for purposes of illustrating the basic underlying computer components (e.g., database server) that may be employed for implementing the present invention. For purposes of discussion, the following description will present examples in which it will be assumed that there exists a "server" (e.g., database server) for purposes of implementing the processes described below. In typical operation, such a server communicates with one or more other computers, including "clients" (e.g., customer or end-user computers that are "database clients" of the server). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview

The present invention comprises a distributed system with methodologies that optimize data transfer among various resources in the distributed system when nodes (instances) have possibly varied or heterogeneous buffer pool configurations in their caches. In accordance with the invention, each node or instance in a distributed shared disk cluster can support multiple buffer pools in its cache, with the buffer pools' sizes being tailored to the node's access patterns and hence providing support for large contiguous I/Os at all nodes. The ability to perform large I/Os helps improve the I/O performance of the node and achieve a higher throughput. This is important in the face of ever-increasing CPU speeds. With no corresponding increase in I/O speeds, such systems face an I/O bottleneck, thus hampering the ability to do large I/O operations that could result in significant improvement in performance.

Figure 3A:
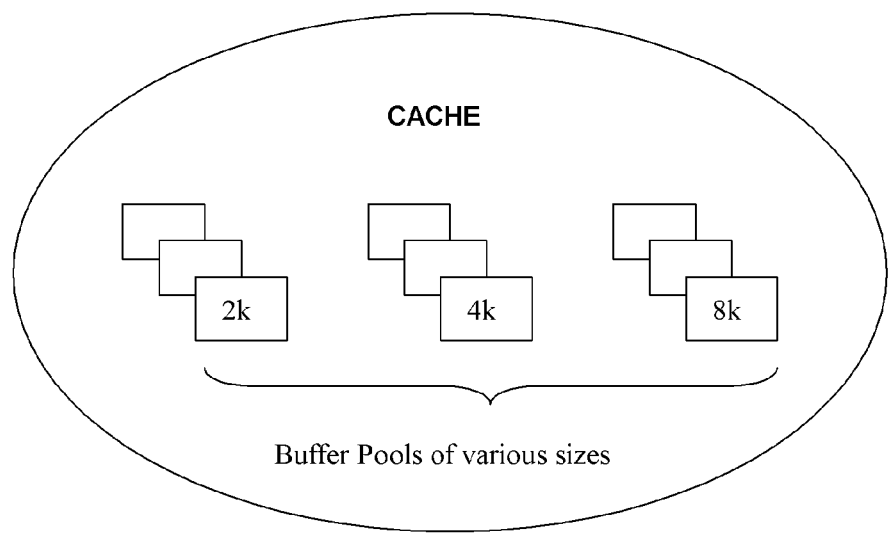
FIG. 3A is a block diagram illustrating a cache having buffer pools of sizes 2 k (kilobyte), 4 k and 8 k.

As illustrated in FIG. 3A, a buffer pool holds a set of contiguous pages in a cache. A cache at a node comprises a set of buffer pools of various sizes, as shown. The lowest pool's size is the same as the database page size, and the largest pool is MAX_LIMIT times as large as the database page, where MAX_LIMIT is a limit imposed by the database system's (e.g., ASE's) cluster server configuration. This enables the node to read/write a set of pages in the form of a pool.

Figure 3B:
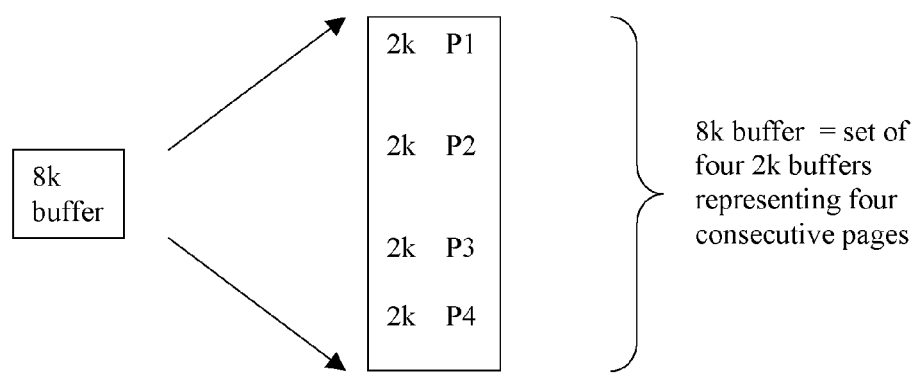
FIG. 3B is a block diagram illustrating a scenario where, for a buffer pool of size 8 k bytes, a node can read/write four contiguous pages.

FIG. 3A is a block diagram illustrating a cache having buffer pools of sizes 2 k, 4 k and 8 k. The 2 k pool can hold one database page, the 4 k pool two database pages, and the 8 k pool four database pages. (Each database page itself comprises a storage unit for a database object, such as a table, index, or the like.) For instance, assuming the database page size is 2 k bytes, the node can configure buffer pools of sizes 2 k, 4 k, 8 k or 16 k bytes, thus enabling it to read/write 1, 2, 4 or 8 contiguous pages simultaneously. If a buffer pool of size 8 k bytes is used, the node can read/write four contiguous pages, as illustrated in FIG. 3B. So, a single I/O operation can handle four pages instead of four I/O operations that would have been required otherwise. The buffer pools are used for pre-fetching data assuming a high likelihood of the pages being accessed contiguously (i.e., principle of locality of reference—spatial locality which says if page x is accessed there is a high likelihood of pages close to x being accessed subsequently immediately). Thus in such a situation, contiguous database pages can be pre-fetched and kept ready for subsequent immediate accesses.

Figure 3C:
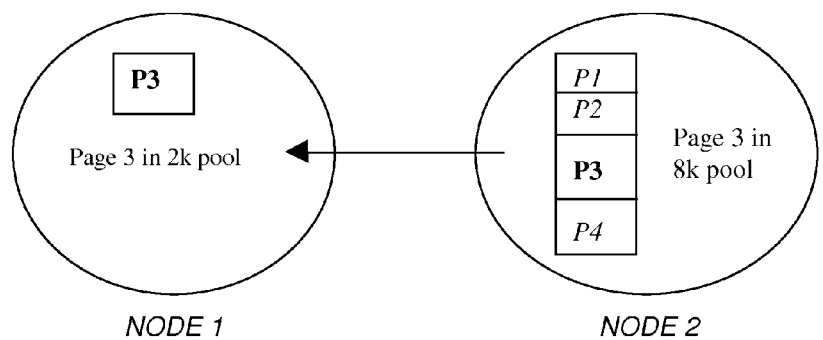
FIG. 3C is a block diagram illustrating a scenario where a database page can simultaneously reside in a 2 k buffer pool in one node and in a 8 k buffer pool in another node.

In accordance with the present invention, data can reside partly or fully in any buffer pool of any node in the form of the database pages. There is no restriction imposed that the buffer pools be of the same size across all nodes. Each node can configure buffer pools of any size (typically, subject to a maximum limit) independent of the other nodes. There is also no restriction that a database page must reside in the same buffer pool in all nodes. For instance, a node can configure buffer pools of 2 k, 4 k and 8 k, and another node can configure buffer pools of 8 k and 16 k. A database page can simultaneously reside in a 2 k buffer pool in one node and in a 8 k buffer pool in another node, as illustrated in FIG. 3C.

Figure 3D:
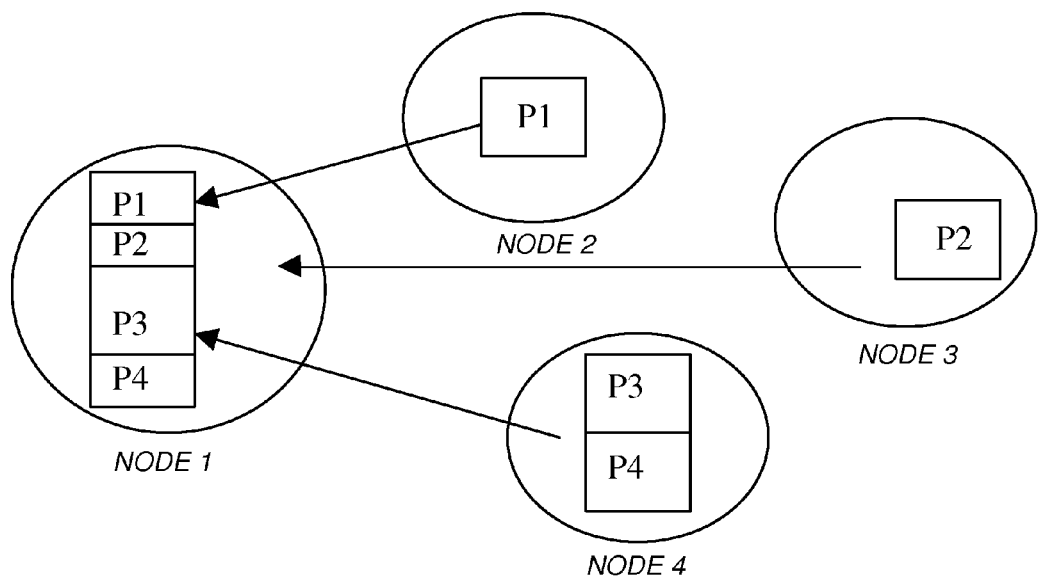
FIG. 3D is a block diagram illustrating direct memory-to-memory transfer across nodes through a network.

When a node needs to access data, it chooses a buffer pool of the appropriate size, depending upon various parameters such as the nature of the query, prefetch size, availability of buffer pools, or the like; it then makes a request for the data to the synchronizing (i.e., lock granting) resource. When a node makes a request for such data, i.e., a set of contiguous pages in a buffer pool, the pages are transferred from the other nodes holding them. If all the pages are in the buffer pools of other nodes, they are transferred from the corresponding memory space of these nodes to the memory space of the node requesting them. This is a direct memory-to-memory transfer across nodes through the network, as shown in FIG. 3D.

In accordance with the present invention, there is no restriction that all the database pages requested must be present in buffer pools of the nodes. Some database pages might be present on the persistent storage resource (i.e., disk). This approach of the present invention provides an important optimization for data transfer. If one of the database pages is on the persistent storage resource, data is not transferred from other instances. Instead the whole set of data (i.e., all the database pages) is read from the persistent storage resource (disk) into the requesting node's buffer pool. This provides the following important efficiencies:

1. One avoids a possible set of transfers from various nodes, and the requesting node need not keep track of the transfers.

2. The persistent storage has to be accessed anyway for a part of the data (i.e., one or more database pages that are not present in any buffer pools of any instance), and the entire data (i.e., the set of database pages being contiguous) can be read in a single I/O operation with almost the same overhead.

The invention is advantageously applied in distributed systems, such as distributed database systems. The ability to handle large I/Os in a distributed system with facility to tune the buffer pool configuration at each node according to the local access patterns independent of the configurations at other nodes greatly benefits the applications running in a distributed environment. The synchronizing resource or lock manager, as part of granting access, determines the optimal way of transferring the set of database pages and takes the appropriate action (e.g., sending instruction messages to various nodes). As another optimization, however, the approach of the present invention does not incur any additional overhead in terms of the number of messages across nodes in supporting multiple buffer pools. A given page can reside in any buffer pool in a node, as each node is given the freedom to configure its own buffer pools based on its own local access. For example, at Node 1 a given page could reside in a 4 k buffer pool, at Node 2 the page could reside in an 8 k buffer pool, and so forth and so on. In the currently preferred embodiment, the lock manager (CLM) need not be concerned with which buffer pool a given page resides in for a particular node. Instead, the lock manager simply knows that a given page resides at a particular node. Each owning node is responsible for downgrading locks (when applicable) and starting transfers of pages (when required). The buffer manager (layer) at each owning node is responsible for uncovering the appropriate buffer pool where a given page resides, and for starting a transfer (when required) from that memory location. Therefore, in the currently preferred embodiment, both the requesting node and the lock manager are unconcerned about which particular buffer pool a required page resides in. This approach simplifies the design of the lock manager, and allows it to be operated with less overhead.

Optimizing Data Transfer Among Various Resources in the Distributed System

In the currently preferred embodiment, the present invention is implemented via Cluster Buffer Manager (BCM) and Cluster Lock Manager (CLM) modules that interact closely to provide scalable and robust design to the underlying database system architecture (e.g., Sybase® Adaptive Server® Enterprise). Implementation of the present invention necessitates changes to the existing Cluster Lock Manager (CLM). The construction and operation of these modules will now be described in further detail.

The Cluster Lock Manager (CLM) comprises a module that provides an interface (i.e., APIs) to lock individual database pages. The Cluster Buffer Manager (BCM), on the other hand, supports large buffer pools where a MASS can hold more than one database page. It is essential to support large buffer pools for compatibility and performance. The solution provided by the present invention addresses the functionality to support multiple buffer pools in a Shared Disk Cluster. The following description focuses on design and implementation of the multiple-buffer pool support in the Cluster Buffer Manager (BCM).

Figure 4:
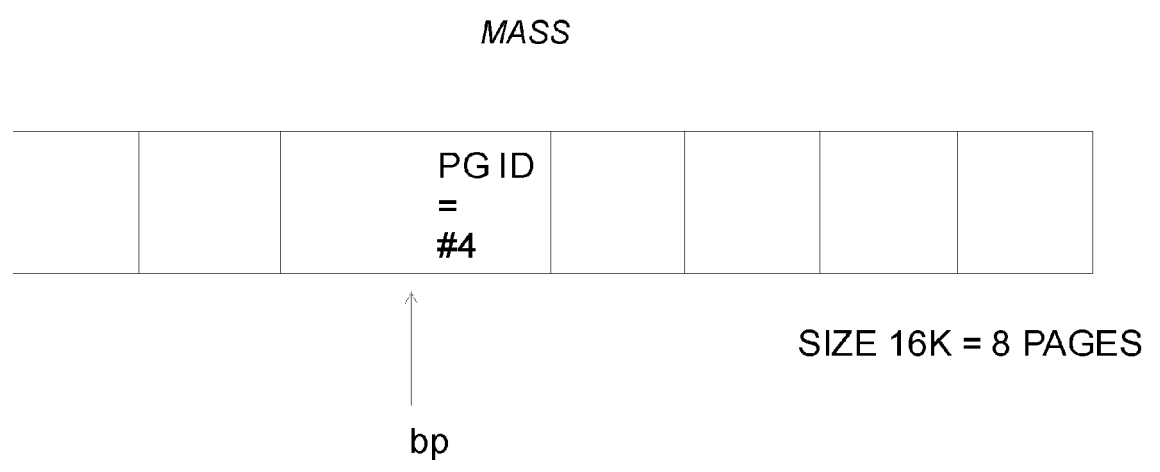

As shown in FIG. 4, a "MASS" is simply a logical grouping of buffers of a particular size, such as a group of 2 k buffers or pages. In operation, the Cluster Buffer Manager (BCM) will return a buffer pointer, bp, to the requested page within the MASS, such as page #4 as shown in the figure. In response to the foregoing request, therefore, the system actually completes a 16 k I/O operation, bringing in eight pages. All subsequent requests for pages in the MASS result in the MASS being found in cache and a corresponding pointer (bp) being returned to the particular buffer within that MASS which is desired. The actual size of the MASS employed can be fine tuned to the particular storage device from which the information is read. Each of the MASSes of a particular size (e.g., 2 k MASSes) is linked to its own LRU chain. In this manner, the system knows exactly where to locate each size buffer that is required.

In order to understand the modifications for implementing the present invention, it is helpful first to review the locking of pages. Going from a basic implementation to one supporting buffer pools of various sizes ranging from say 2 k (SYBPAGESIZE) to 16 k (8*SYBPAGESIZE), that is, the size of an EXTENT for data pages, changes are required in the way the pages in a MASS are locked physically. An EXTENT is a contiguous interval of disk pages (e.g., 8 pages), the identifier of whose first page is an integer multiple of the size of the interval. In the currently preferred embodiment, locking is effectively at MASS level. The client requests a lock on a set of pages that are part of a MASS. The response is either all or none: the system either grants all locks, or grants no locks. There is no partial locking. Under non-blocking mode, the Buffer Manager (BM) sees some locks granted and some not, but the client of Buffer Manager (BM) is always reported with an "all or none" status. As part of the lock being granted to the client, the MASS in which the requested pages fall is invalidated at another node (if it exists). If the pages do not exist in the cluster (at any node), the client reads the entire MASS from the disk after the lock on it is granted.

The lock requests are batched in order to avoid increase in the number of messages to be sent to the Lock Master (if it happens to be remote). The resources that are locked (i.e., pages) are hashed based on their extent number and the Lock Master allocates accordingly so that all pages that fall in an EXTENT having the same node as its Lock Master. This reduces complexity, as multiple nodes need not be contacted for pages in a MASS.

The approach of the present invention takes into account the effort required to move to other feasible options on performance grounds, for example for future upgrades. For instance, the locking at the Cluster Buffer Manager (BCM) is still done at page-level so as to enable the (future) option of page-level locking and to facilitate tracking the dirty status of a page. The currently preferred embodiment deals with physical locks at MASSes as far as the Cluster Buffer Manager (BCM) is concerned. Those skilled in the art will appreciate that teachings of the present invention may be applied to locking larger entities, such as EXTENTS, in cases where lock requests are most likely to come from a single node (e.g., in a "very effectively partitioned" application situation) or locking individual pages and moving the dirty status from MASS level to buffer (page) level in cases where contention is very high.

Strategies

Alternate strategies were considered for implementing the present invention. These include the following.

1. Physical locking could be done at MASS level, with one LOCKREC for each MASS being locked. The rest of the scheme of invalidating the MASS at the owner remains the same but this is done at the Lock Master instead of the Cluster Buffer Manager (BCM) at the owner. This design complicates the Cluster Lock Manager (CLM) module and was not thought of as promising. The Lock Master needs to maintain a secondary namespace apart from the single LOCKREC for the MASS, in which the information regarding what pages the MASS consists of should be present to be able to send downgrade/transfer requests to pages, to be able to detect the overlapping of pages in a MASS, and so forth. This would complicate the Cluster Lock Manager (CLM) design.

2. Another strategy is to sort of homogenize the pool size in the sense that the requester would first find out the pool size from the Cluster Lock Manager (CLM) by querying the directory service (where the MASS size is cached) and then retry with the correct MASS size. This involves more messaging between Cluster Buffer Manager (BCM) and Cluster Lock Manager (CLM). For every request, a message needs to be sent to the Directory Service to find out the MASS size and then request the Lock Master for a lock. More messages are considered to be a block on performance and once messaging is involved, reliance on factors external to the node (CPU at node), i.e., network, bandwidth, and the like comes into picture, which should be minimized.

3. Locking at page-level with moving the dirty status from the MASS to the buffer is another option. The nodes deal only in pages and the MASS now carries holes. This would necessitate substantial changes in the existing Cluster Buffer Manager (BCM), potentially making it an error-prone approach. The current Cluster Buffer Manager (BCM) maintains the dirty status bit and other status at MASS level. Moving dirty status to buffers necessitate changes in almost all parts of Cluster Buffer Manager (BCM), which can be error-prone. Also the first buffer's header can no longer be overloaded with the MASS information; it needs a separate header. Moreover, if one page is locked at a time, the number of messages will increase compared to locking (or sending one lock request per) one MASS at a time, and messaging is costly.

4. Maintaining a single LOCKOBJ for an EXTENT was also considered but it would increase the size of LOCKOBJ structure significantly since the page information has to be tracked at the Lock Master. This has the same disadvantage that comes with maintaining a single LOCKOBJ per MASS, as discussed above. The Lock Manager logic gets complicated, as it needs to recognize and maintain a secondary namespace (involving pages) beneath the LOCKOBJ and LOCKREC design. Different pages can be locked in the extent by different tasks (across different nodes)—tracking this and avoiding deadlocks involves more changes to be done to the Cluster Lock Manager (CLM).

Preferred Approach

Design Assumptions

In formulating the preferred approach, the following design assumptions were made:

1. Medium scheme of buffer transfer is adopted. When a node gets a request to downgrade the lock and transfer the page, it flushes the data page to the disk and then transfers the page to the requester.

2. The dirty bit is maintained at MASS level, the underlying reason being that a MASS is usually used to prefetch data pages for index scans or table scans, which are read operations.

3. The Cluster Lock Manager (CLM) follows page-level locking as this leaves the possibility of moving to page-level handling in Cluster Buffer Manager (BCM) in the future.

Shared Data Structures

The client requesting a lock is referred to as requester (denoted by R). The lock master (mastering the lock resource for that page) is denoted by M, and the lock owner holding the page (and the lock ownership of the page) is denoted by O. "Client" in the following context means the client external to the buffer manager. The part of the Cluster Buffer Manager outside the Cluster Buffer Manager (BCM) thread is referred to as BM. The design will now be described in terms of happens at R, M, and O.

Cluster Lock Manager (CLM)

This section describes the design extensions to the Cluster Lock Manager module including the APIs that are provided.

1. N LOCKRECs for a MASS of N Pages

The Cluster Lock Manager (CLM) supports the locking for a MASS through a list of locks, with one lock for each buffer in the MASS. BM can store the returned LOCKREC pointers in the buffer headers of the MASS.

2. N LOCKOBJs for a MASS of N Pages

The LOCKOBJ is maintained to be per page and N LOCKOBJs are created as a result of a batched lock request for N locks for a MASS. The physical LOCKOBJ hashing algorithm is changed to make sure that all locks in an EXTENT are hashed into the same lock hash chain. The master assignment algorithm in Lock Directory Service is also changed to make sure that locks in the same EXTENT are assigned to the same Lock Master.

Figure 5A:
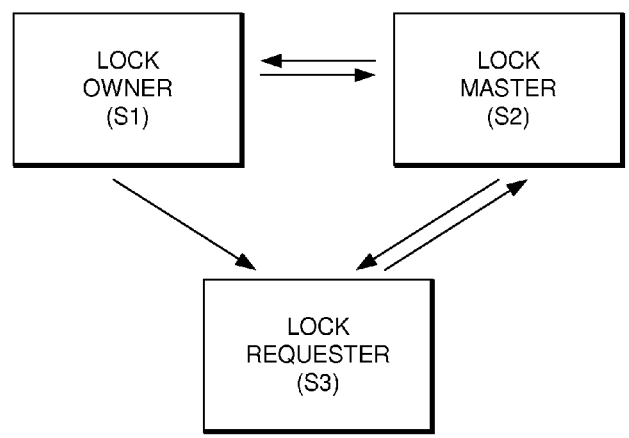
FIGS. 5A-B are block diagrams illustrating the interaction among a Lock Owner, a Lock Master, and a Lock Requester.
Figure 5B:
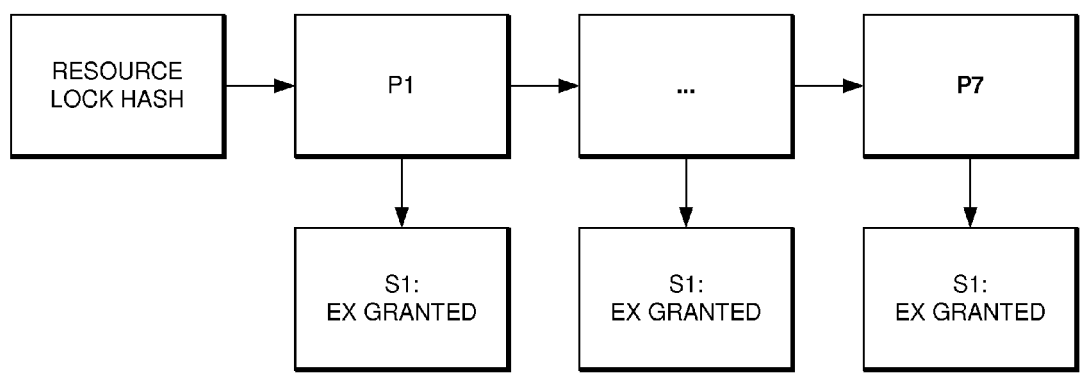

FIGS. 5A-B are block diagrams illustrating the interaction among a Lock Owner, a Lock Master, and a Lock Requester. As an example, consider a three node cluster with S1 being the Lock Owner, S2 being the Lock Master and S3 being the Lock Requester, as shown in the figure. Initially, S1 owns P1 with a MASS size of 1 page and P6 and P7 in MASS size of 2 pages. FIG. 5B shows the Lock Objects in a lock hash chain (same chain if same EXTENT). As a result, LOCKOBJs P1, P6 and P7 are hashed onto the same lock hash chain, with one LOCKREC each enqueued for S1, as shown in FIG. 5B.

3. At Lock Requester (R)

At a new locking request for a list of locks corresponding to a MASS, the local Lock Master will search the LOCKOBJs from the local lock hash chain using the input lock names (dbid, cid, pageid). If any of the LOCKOBJs do not exist, a LOOKUP request with the list of locks will be sent to the Lock Directory Service. Note that it is considered an error if any of the locks is already held but is again asked with a NULL lock handle. Once the Lock Master is known (either non-NULL lock handles are provided at the time of request or the LOOKUP reply is received from the Lock Directory Services), a batched locking request will be sent to the Lock Master.

For blocking API call, the client thread will be placed to sleep until all locks can be granted at the Lock Master or a LOCK_DEADLOCK error is reported. When the client thread is woken up, the BM checks if all locks are granted, and if any of them has pending data transfer. Disk I/O for the MASS is issued if all locks are granted without pending data transfer. If there are pending data transfers, the client thread needs to be placed to sleep until all data for the MASS is either received from network or read from the disk (in the case of TXCANCEL). For non-blocking API call, (i.e., LOCK_NOWAIT), the API will return as soon as the batched locking request is sent to the Lock Master. When all locks can be granted or a LOCK_DEADLOCK error is encountered, the locking reply will be delivered through the AST callback handler. The Cluster Buffer Manager (BCM) thread that services the lock reply checks if all locks are granted and if any of them has pending data transfer.

4. At Lock Directory Service

At a lookup request for a list of locks, if any of the LOCKOBJ in the same EXTENT can be found in the lock hash chain, the same master is assigned to new LOCKOBJs. In the above example, if the Lock Directory Service has a lock hash chain with P1, P6, and P7 assigned to Lock Master S2, when a request for P0 to P3 from Lock Requester S3 comes, new LOCKOBJs P0, P2 and P3 will be placed into the same chain and assigned to the same master. The Directory Service will also replicate the new LOCKOBJs to satisfy the high availability requirement.

5. At Lock Master (M)

When new locking request with a list of locks reaches Lock Master, the Lock Master will again locate the LOCKOBJs in the hash chain. In the above example, when S3 asks for locks on P0 to P3, Lock Master will place three new LOCKOBJs for P0, P2 and P3 into lock hash chain and enqueues four LOCK-RECs to each of the LOCKOBJs for P0, P1, P2, and P3. If the lock mode is in conflict, a BAST will be fired to the owner of P1, asking for downgrading the lock associated with P1. The BAST request may also indicate data transfer requested. Lock Master will only request for transfer if all of the requested locks have current owners (i.e., all requested data pages are cached in some nodes). In the example, since P0, P2 and P3 have no previous owners and must be read from disk, the Lock Master will only request the Lock Owner to downgrade the lock. When the lock is downgraded, the Lock Master will return to the Lock Requester with a message that P0 to P3 are all granted without pending data transfer.

6. At Lock Owner (O)

When receiving a BAST, the Cluster Buffer Manager (BCM) checks if transfer is requested and if the corresponding MASS is dirty. The transfer request should be serviced and if the MASS is dirty, all buffers in the MASS should be flushed. If downgrade is requested, the Cluster Buffer Manager (BCM) downgrades all the locks associated with the MASS to the lock mode as requested by the BAST. The following example shows the Lock Master's state when the owner (S1) must be invalidated on behalf of new requesters (S2 and S3) due to overlapping and conflicting locks.

Figure 6:
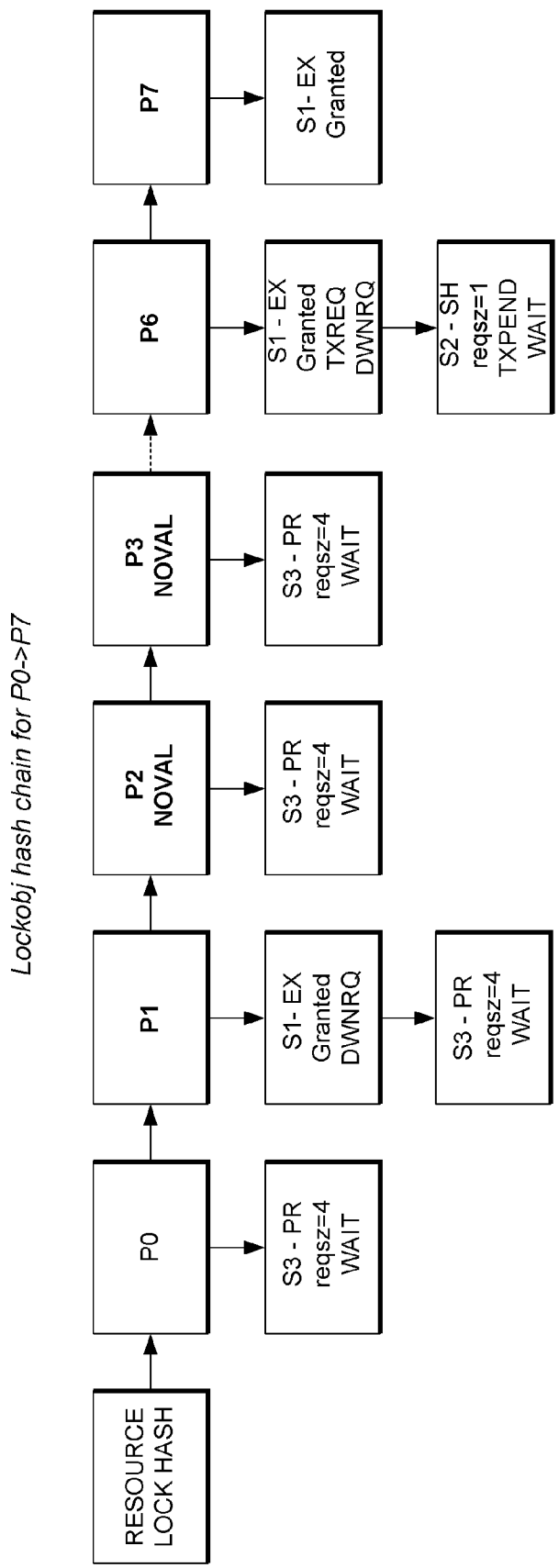
FIG. 6 is a block diagram illustrating Lock Master operation.

FIG. 6 is a block diagram showing the Lock Master state, at the time when node S3 requested for P0 to P3 and S2 requested for P6. Here conflicting lock mode is assumed. The lock queue manipulation and BAST handling is relatively straightforward since the requested size is kept in LOCK-RECs. Should a new request come for any LOCKOBJs in question, it will notice some LOCKRECs is in WAIT or REQ pending status and have to wait till this status is cleared. Once the pending status is cleared, the lock queues of all involved objects must be searched to determine what needs to be done.

Buffer Manager (BM)

Figure 7:
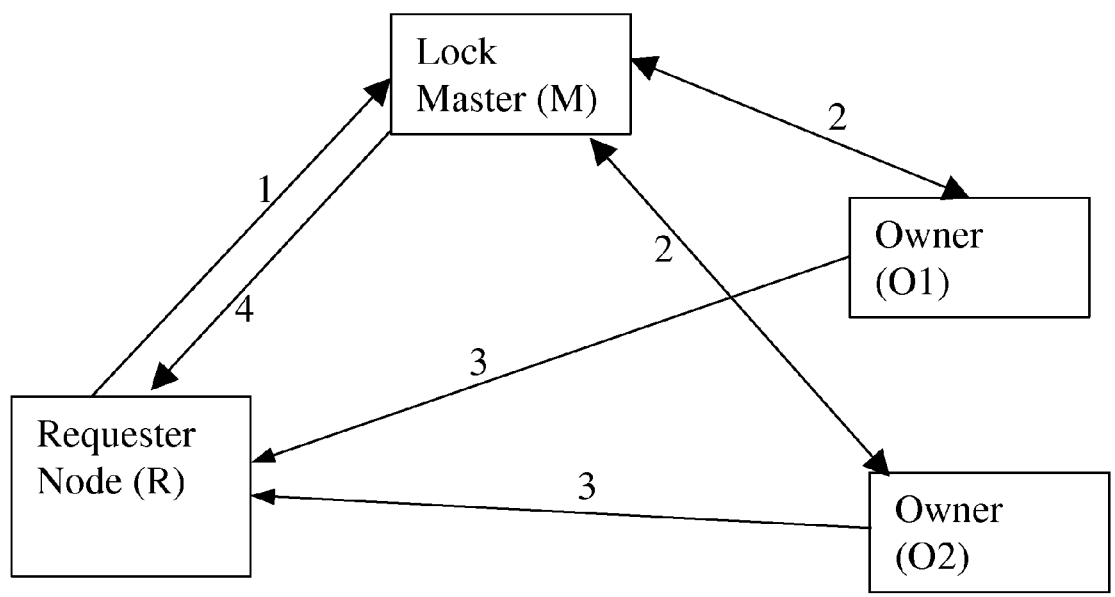
FIG. 7 is a block diagram illustrating design changes to the Cluster Buffer Manager module.

With reference to FIG. 7, the following describes the design changes to the Cluster Buffer Manager module.

1. Searchers

R, while doing a cmcc_bufsearch( ), finds the buffer is in the cache and then goes on to acquire a physical lock in the appropriate mode. The BM upon doing a search finds the page in a certain MASS and takes a physical lock on the entire MASS. Before acquiring the physical lock, it acquires a latch on the page. Going to multiple pools, it still acquires a latch on a page but asks for a physical lock on the MASS in which the buffer resides.

2. Grabbers

R after choosing a local pool (according to the virtual space strategy passed in by the access layer) acquires a latch on the buffer. Then it proceeds to hash the buffer. It hashes the buffer, and then asks for a physical lock on the MASS chosen. So, even in this case, R holds a latch on a single page in the MASS and asks for a physical lock on the entire MASS.

Both searchers and grabbers use the interface cmcc_buftransfer( ) to acquire a physical lock. The code path that follows is cmcc_getphysicallock( )->lock_multiple_physical( ).

The current status bits like MASS_IN_TRANSFER, MASS_PHYLOCKBASTPENDING, and the like are maintained at the MASS level. New status bits are introduced corresponding to the MASS_xxx bits indicating they are used for individual buffers, like BUF_TXPENDING is introduced to indicate a transfer pending on a buffer.

The status bits MASS_PHYLOCKBASTPENDING, MASS_IN_TRANSFER, MASS_PHYLOCKRLSPND, MASS_CLUSTERPRIVATE, MASS_WTSHRSPL, MASS_ REMSHRSPLINPROG, MASS_RLSPHYLOCK, MASS_PRIVTONODE, MASS_PHYLOCKCLEANUP, MASS_BASTDEFERRED, MASS_INPENDINGQUE, MASS_INRELEASEQUE, MASS_RLSPROCESSPND are still maintained at the MASS level. These bits are not used in the buffers of the MASS other than the first buffer.

The status bits MASS_PAGETRANSCANC, MASS_TXPENDING, MASS_PAGETRANSCOM, MASS_PHYLOCKNOVAL, are maintained at all buffers in the MASS and are renamed to BUF_<xxx>.

Some of the bits BUF_<xxx> to be introduced can be in addition to the ones present and some can take the place of the MASS_<xxx> bits being used currently.

MASS_PHYLOCKGRANTED is used for searchers to block on it. The client proceeds with dealing with the MASS only after it acquires all the locks on the MASS and MASS_ PHYLOCKNOVAL and BUF_PHYLOCKNOVAL are both used. BUF_PHYLOCKNOVAL is used for diagnostic purposes (to track why a read has been issued on the MASS; truly a MASS read or a read because of a TXCANCEL on a buffer in which case the BUF_PHYLOCKNOVAL bit is also set).

The rest can be replaced (MASS_<xxx> bits reused) by BUF_<xxx> bits.

The new status bits are created: BUF_PAGETRANSCANC, BUF_PAGETRANSCOM, BUF_PHYLOCKNOVAL, BUF_TXPENDING. Two additional bits are maintained in a "bclus_stat" variable, which has space to accommodate them at present.

The Lock Requester (R) uses the API call, lock_multiple_physical( ) provided by the Cluster Lock Manager (CLM), to acquire locks on all the pages in the MASS. If the passed in mode is blocking mode (flag LOCK_NOWAIT is not set), the call blocks until all locks are granted. If any of the locks cannot be granted for some reason, the response is "not granted" on all of the pages. If the flag LOCK_NOWAIT is set indicating non-blocking mode, the response is "lock granted" on some pages and "request queued" on some pages depending upon on what pages are the locks held by other tasks. In such a case, the Cluster Buffer Manager (BCM) thread at R will wake up the task only after all locks are granted.

After the locks are granted, the awakened task finds out from the LOCKMSTAT (returned by the Cluster Lock Manager (CLM) for the set of pages), the status of each page. If the transfer has started on any of the pages, it waits for the transfer to complete. If the transfer fails on some of the pages, they have to be read from the disk. The MASS_IN_TRANSFER bit is currently set at MASS level. This is maintained at the buffer level. The status bits in the lockstat structure returned for a page, is only looked at by AST handler. The AST handler sets the status in the buffer headers of each page (instead of the MASS).

Once the AST handler returns (even in blocking mode, the AST handler is called), the BM (in cmcc_getphysicallock( )) checks the status in buffer headers. It waits for status BUF_TXPENDING bit to be cleared. If, after the transfer is complete on the pages on which it was issued, any buffer has BUF_PAGETRANSCANC bit set meaning the transfer has been cancelled, the BM sets the bit MASS_PHYLOCKNOVAL to ask the client to read the page from the disk. It also sets the BUF_PHYLOCKNOVAL bit to indicate this read was issued because of a single page. If the lock master has responded with status BUF_PHYLOCKNOVAL on all pages, then client issues a disk I/O to read the entire MASS.

The Lock Master (M), upon receiving the request, attempts to grant the locks by asking the owners (there can be multiple owners of pages in the MASS) to downgrade and start a transfer, or just downgrade their locks. Depending upon the locking mode, the downgrade is inevitable (in case of conflict) but not the transfer.

If any of the pages asked for is on the disk, no transfer need be started on the other pages of the MASS since anyway the BM at R needs to go the disk. In medium scheme, no transfer is started and R reads the MASS from the disk. However if M finds that all the pages are in the cluster, a transfer is started on all of them.

Let "m" be the MASS size being requested by R ("m" requests batched into one). Let "n" be the number of pages in the cluster (at different nodes) and "p", be the number of pages that are held in conflicting mode.

Case I: (n=m)

M decides to transfer all the pages from different nodes to R. It issues BAST downgrade and transfer to "p" of the pages and only BAST transfer to the rest of the pages. Note that it cannot happen that some pages in a MASS at any O (Owner) get BAST downgrade and transfer, and some get BAST transfer, because the BM deals at MASS level. Either all pages in the MASS get BAST downgrade and transfer, or all of them get BAST transfer.

Case II: (n<m)

M notifies the Cluster Buffer Manager (BCM) at R to read the MASS from the disk. It issues BAST downgrade (but no transfer) to "p" of the pages and grants locks on the rest of the pages. Note that the O gets either a BAST downgrade request on all the pages in the MASS, or on none. This depicted as step 3 in FIG. 7, from M to O1 and O2.

The Lock Master replies to the Cluster Lock Manager (CLM) at R (Step 4) when it gets a response from the owners about the successful downgrade of the locks. If the locking mode is blocking, the Lock Master replies to the Cluster Lock Manager (CLM) at R only after all the owners respond with a "downgrade successful" message to M. It batches the response for all the pages in the MASS.

At the Lock Owner (O), the Cluster Buffer Manager (BCM) at the lock owner, upon receiving the BAST first validates whether the requested pages exist. If the pages are not present in the node it indicates this to the Lock Master by canceling the lock request.

BAST may have downgrade and (or) transfer request. If the pages are in conflicting lock mode then O will receive downgrade. If all the pages are cached at various nodes then M will request O to transfer the pages.

The Cluster Buffer Manager (BCM) treats BAST requests for a set of pages at once. It deduces if the requested MASS size is less than the current MASS size of the pages it holds. This is true if it holds all the pages the request has come for and there are additional pages in the MASS. It keeps all the buffers in the MASS and sets the MASS_PHYLOCKBAST-PENDING on the MASS.

If R's MASS size<O's MASS size, and:

(i) If the MASS is dirty, the Cluster Buffer Manager (BCM) flushes the entire MASS on to the disk. It then starts a transfer on the pages in the requested range, if a transfer has been requested, and downgrades all the locks in the MASS, if a downgrade has been requested; or (ii) If the MASS is not dirty. Cluster Buffer Manager (BCM) starts transfer on the pages in the requested range, if a transfer has been requested, and downgrades all the locks in the MASS if the mode of locking conflicts. (Steps 2 and 3 in the figure).

If R's MASS size>=O's MASS size, and:

(i) If the MASS is dirty, the Cluster Buffer Manager (BCM) flushes the entire MASS. If requested by M, it starts a transfer on the range of pages requested (i.e., all the pages in the MASS at O) and then downgrades all the locks, if a downgrade has been requested; or (ii) If the MASS is not dirty, the Cluster Buffer Manager (BCM) transfers the pages in the requested range (i.e., all the pages in the MASS at O) if requested by M, and downgrades all the locks in the MASS, if a downgrade has been requested. (Step 2 and 3 in the figure).

Messaging

Consider following terminology for the analysis:

MASS size at the requester is m and no. of pages (of that MASS) present in the cluster is n. ($n<=m$).

Out of the n, p pages are held in conflicting mode. ($p<=n$).

Directory Services are replicated at k nodes.

The Lock Master for all the pages in a MASS is the same. (It is the same for all the pages in an extent).

Case when (n=0)

In this case none of the pages are cached in the cluster. Requester has to read it from the disk.

Total messages=$[1+k+]1+1$

For both blocking and non-blocking modes this number remains the same.

Case when ($n<=m$)

In this case some or all of the pages are in other nodes.

Case when (n=m)

In this case, all the pages are in the cluster and hence we decide to transfer and not read any of them from the disk.

Total messages $[1+k+]1+n+1$ (if there are no conflicting requests)

$[1+k+]1+3p+(n-p)+1$ (if there are p conflicting requests)

For NOWAIT case, in addition to these messages, in the worst case there will be additional "m" messages arriving later when the locks on the other pages are granted.

Case when (p=0) and (n<m)

This is when there are no conflicting requests. All can be granted.

Total messages=$[1+k+]1+1$

Case when ($p<=n$) and (n<m)

This is when there are conflicting requests.

Total messages:

$[1+k+]1+3p+1$

For NOWAIT case, in addition to these messages, in the worst case there will be additional "m" messages arriving later when the locks on the other pages are granted.

Extendibility (for Fast Scheme)

Under fast scheme, the following modifications are applied.

(i) If the AST handler finds any of the pages being shipped from O is dirty, it marks the MASS dirty.

(ii) "If any of the pages asked for is on the disk, no transfer need be started on the other pages of the MASS" policy changes. Transfer is always started on pages which are present in the cluster.

(iii) If R's MASS size<O's MASS size, medium scheme is adopted. The MASS is flushed to disk if found dirty.

(iv) If R's MASS size>=O's MASS size and if the downgrade is to NL, the dirty MASS is transferred to R, which takes up the ownership of it. But if the downgrade is to SH, the MASS is transferred to R but O retains the ownership (in terms of dirty status). R does not see the MASS as dirty.

Internal Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Figure 8A:
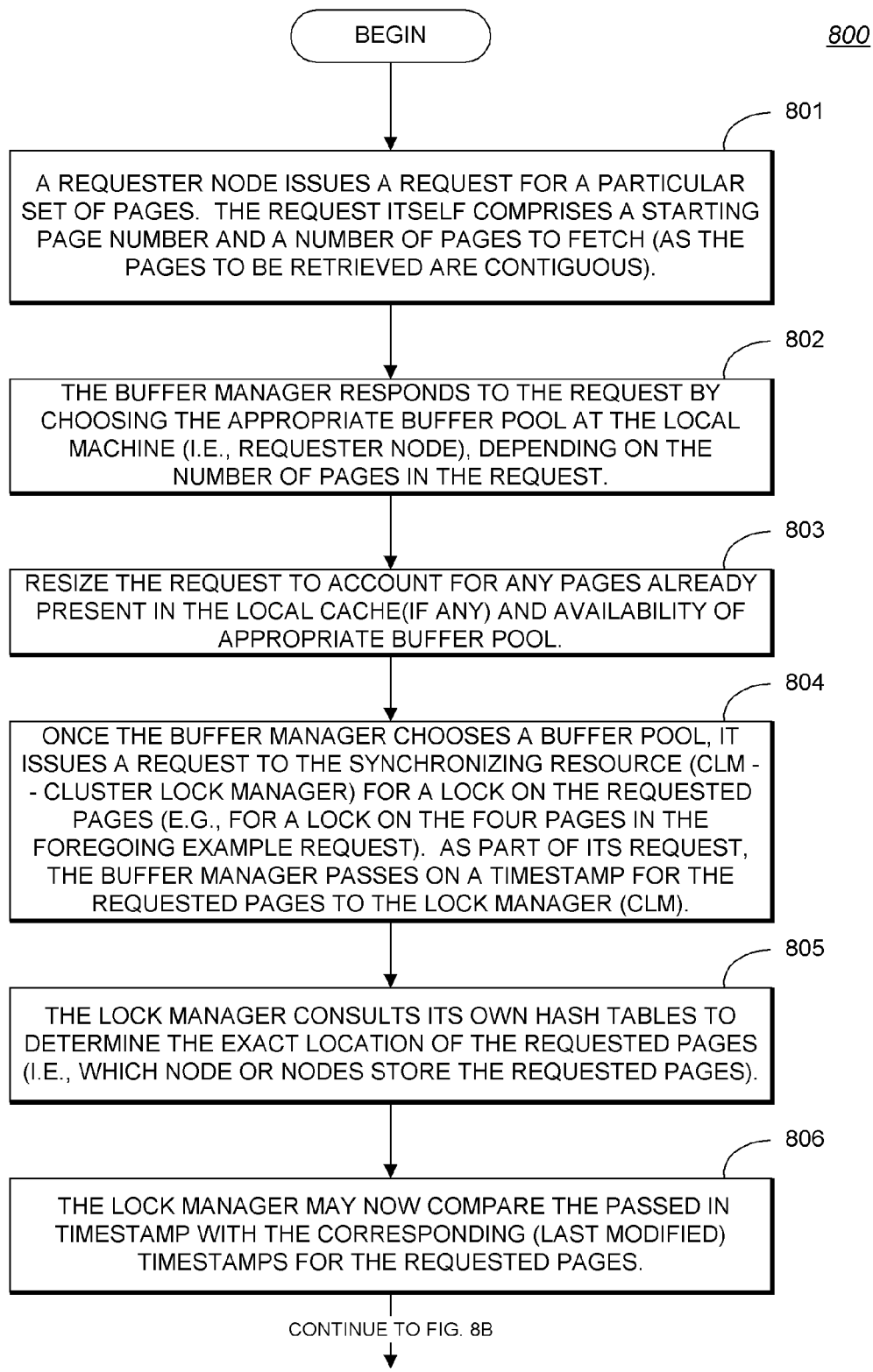
FIG. 8 is a high-level flowchart summarizing operation of the methodology of the present invention for optimizing data transfer among various resources in a distributed environment.
Figure 8B:
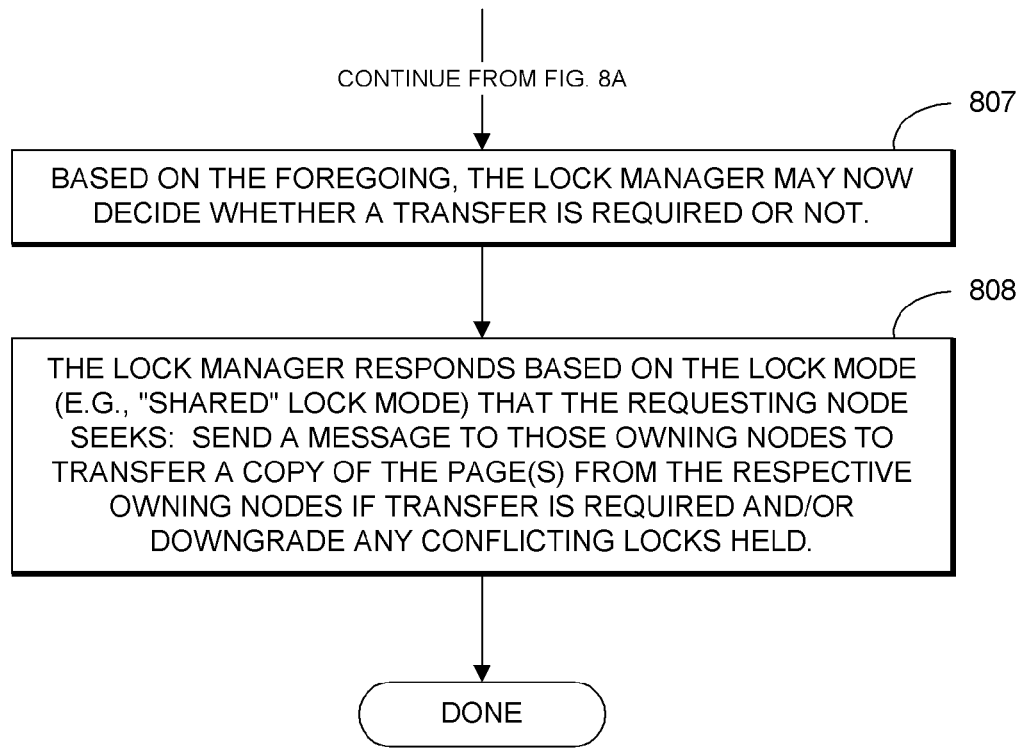

FIG. 8 is a high-level flowchart summarizing operation of the methodology 800 of the present invention for optimizing data transfer among various resources in a distributed environment. The methodology operates at the buffer manager layer in the context that a request is issued for a particular set of data pages. The data pages themselves may reside at a single node (locally or remotely), or may be distributed among a plurality of nodes. For purposes of clarity, the following method steps are described in terms of what happens at requester nodes (i.e., requesting locks) and at owner nodes (i.e., owning locks). At step 801, a requester node issues a request for a particular set of pages. The request itself comprises a starting page number and a number of pages to fetch (as the pages to be retrieved are contiguous). Next, at step 802, the buffer manager responds to the request by choosing the appropriate buffer pool at the local machine (i.e., requester node), depending on the number of pages in the request. Recall that the system has buffer pools of different sizes preconfigured for use. If the request is a two-page request, the buffer manager chooses a 4 k buffer pool (2 k×2=4 k); for a four-page request, it chooses an 8 k buffer pool (2 k×4=8 k); and so forth and so on.

Note that it is possible that some of the pages may already be present in a buffer pool at the local machine (i.e., at the requester node), for example having been placed there in response to a request from a prior task. Therefore, in such a scenario, it is possible to resize (e.g., downsize) a request. For example, if a requester node issues a request for four pages but two of those pages are already present in cache (i.e., present in a 4 k local buffer pool), then the request is downsized or trimmed from a four-page request to a two-page request (i.e., for the two pages that do not presently exist in the 4 k buffer pool). At step 803, the request is resized to account for any pages already present in the local cache (if any) and availability of appropriate buffer pool.

Once the buffer manager chooses a buffer pool, it issues a request to the synchronizing resource (CLM—Cluster Lock Manager) for a lock on the requested pages (e.g., for a lock on the four pages in the foregoing example request), as indicated at step 804. As part of its request, the buffer manager passes on a timestamp for the requested pages to the lock manager (CLM). The timestamp allows the lock manager to determine whether the latest (i.e., current) version of the pages is available in the cluster of nodes or not. In other words, the timestamp allows the requester node to indicate what version of pages it has, and it is up to the lock manager to decide whether a transfer is required or not. For example, if the timestamp has not advanced at a remote node that has the page (i.e., the page has not been modified), then the lock manager will not initiate a transfer (as no transfer is required). On the other hand, if the timestamp has been advanced at a remote node, then the lock manager will recognize that a transfer is required so that the requester node receives a refreshed copy of the page.

The lock manager maintains information about what page resides at what node, including respective timestamps (i.e., last modified) for each page. This information is maintained in the lock manager's internal hash tables. As set forth above, the lock manager receives a request specifying a particular set of pages and a timestamp. The lock manager may now consult its own hash tables to determine the exact location of the requested pages (i.e., which node or nodes store the requested pages), as indicated at step 805. Additionally, the lock manager may now compare the passed in timestamp with the corresponding (last modified) timestamps for the requested pages, at step 806. Based on the foregoing, the lock manager may now decide whether a transfer is required or not, as indicated at step 807.

Certain conditions must exist for a transfer to happen. The first condition is that all of the pages are cached at some other node(s)—that is, the pages are located somewhere in the cluster other than the requester node. Note, however, that if one page does not reside in the cluster (i.e., it must be read from disk), then the lock manager will not start a transfer on any of the pages. Instead, all of the requested pages are read from disk in a single operation. As previously noted, the overhead for reading a set of contiguous pages from disk is roughly the same as the overhead for reading a single page. The second condition involves a timestamp check. Once the lock manager knows all of the pages are in the cluster (i.e., do not need to be read from disk), it performs a timestamp check to determine the particular pages that need to be transferred.

At the end of the foregoing, the lock manager responds based on the lock mode (e.g., "shared" lock mode) that the requesting node seeks, at step 808. Ultimately, the lock manager responds to the request with one of the following two lock messages: (1) grant lock directly immediately (not in a conflicting mode), or (2) grant lock after instruct the owning node(s) to downsize or downgrade the lock (when in a conflicting mode) and the owning node(s) respond after a successful downgrade. The latter situation ("conflicting mode") occurs for example, when (i) the requesting node asks for a shared lock on a page that is owned by a node holding an exclusive lock or (ii) when the requesting node asks for an exclusive lock on a page that is owned by a node holding an exclusive or a shared lock on the page.

In (i), the owning node must downgrade the lock from exclusive mode to "shared" mode (i.e., the owner downgrades the lock that it holds in exclusive mode so that the requesting node may be granted a shared lock) whereas in (ii) the owning node must downgrade the lock from whatever mode it holds the lock in, (exclusive mode or shared mode) to "none" mode.

The lock manager (which knows the lock mode being requested) identifies the various owning nodes for the lock(s) being requested. Therefore, it may proceed to send a message to those owning nodes to transfer a copy of the page(s) from the respective owning nodes if transfer is required and downgrade any conflicting locks held. If transfer is not required, then the lock manager may send a message simply indicating that any corresponding conflicting lock(s) should be downgraded. Note that the system does not wait for the transfer to complete before any required downgrading of the lock occurs.

Figure 9:
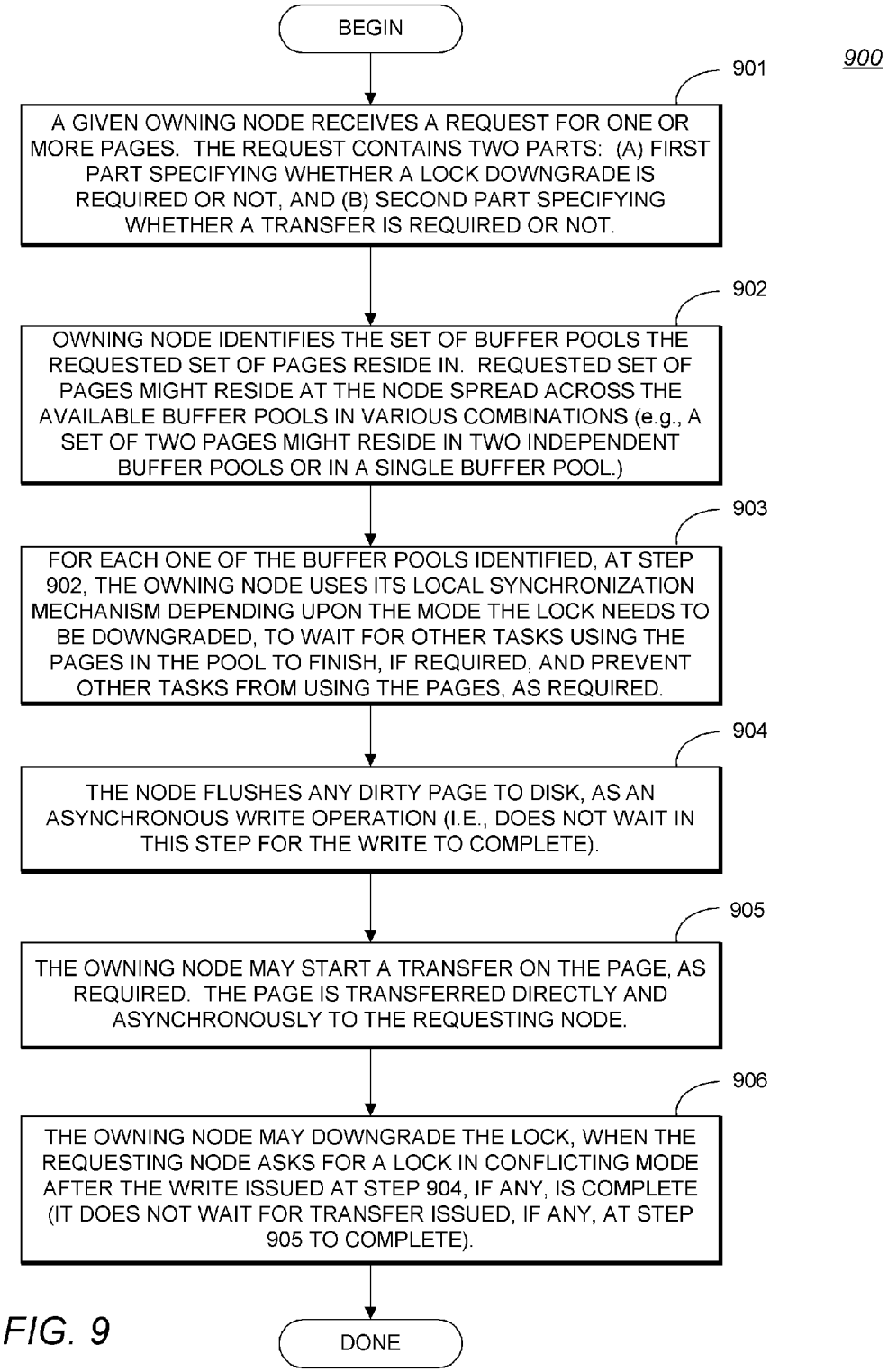
FIG. 9 is a flowchart illustrating the work of the owning nodes (i.e., the nodes that own the pages in some lock mode).

FIG. 9 is a flowchart illustrating the work of the owning nodes (i.e., the nodes that own the pages in some lock mode). As the initial step, step 901, a given owning node receives a request for one or more pages. The request contains two parts: (a) First part specifying whether a lock downgrade is required or not, and (b) Second part specifying whether a transfer is required or not. Consider a scenario where a node (owning node) is holding a shared lock and another node (requesting node) asks for a shared lock. In that scenario, it is not necessary to send a lock downgrade message to the owning node since its currently-held shared lock is compatible with the requested (new) shared lock. Therefore, instead the owning node only gets a transfer message, requesting that it transfer the page to a particular requesting node.

As soon as the owning node gets the request, it locates the set of buffer pools, at step 902, the buffers corresponding to the set of pages, reside in. Then it uses its local synchronization mechanism on the each of the buffer pool identified, at step 902, depending upon the mode the lock needs to be downgraded to, at step 903, so that it can stop other local tasks from using the pages in that buffer pool, if required. For instance, (i) if the lock needs to be downgraded to "shared" mode, local tasks can continue using the pages for read purposes.
(ii) if the lock needs to be downgraded to "none" mode, local tasks are prevented from accessing the pages.

In case (ii) above, the owning node may wait for all local users (if any) to finish using the pages, if required. If a page is dirty (i.e., modified and not yet saved to disk), tested at step 904, the node flushes the pool to disk, as an asynchronous write operation (i.e., does not wait in this step for the write to complete).

Now, the owning node may start a transfer on the page, at step 905, if a transfer is required and may downgrade the lock, at step 906, if requested (i.e., if the requesting node is asking for a lock in conflicting mode) after the write issued at step 904, if any, completes. The page is transferred directly and asynchronously to the requesting node. Direct transfer is made possible because the requesting node, at the time it transfers the timestamp, also transfers its DMA (direct memory access) keys (i.e., memory location) for use in memory-to-memory transfer of requested pages. (DMA keys are transferred through the lock manager.) From the memory location or handle, the owning node knows the memory location where the requested page is to be transferred directly to. As the transfer occurs asynchronously, pages may arrive from various owning nodes at different times.

Figure 10:
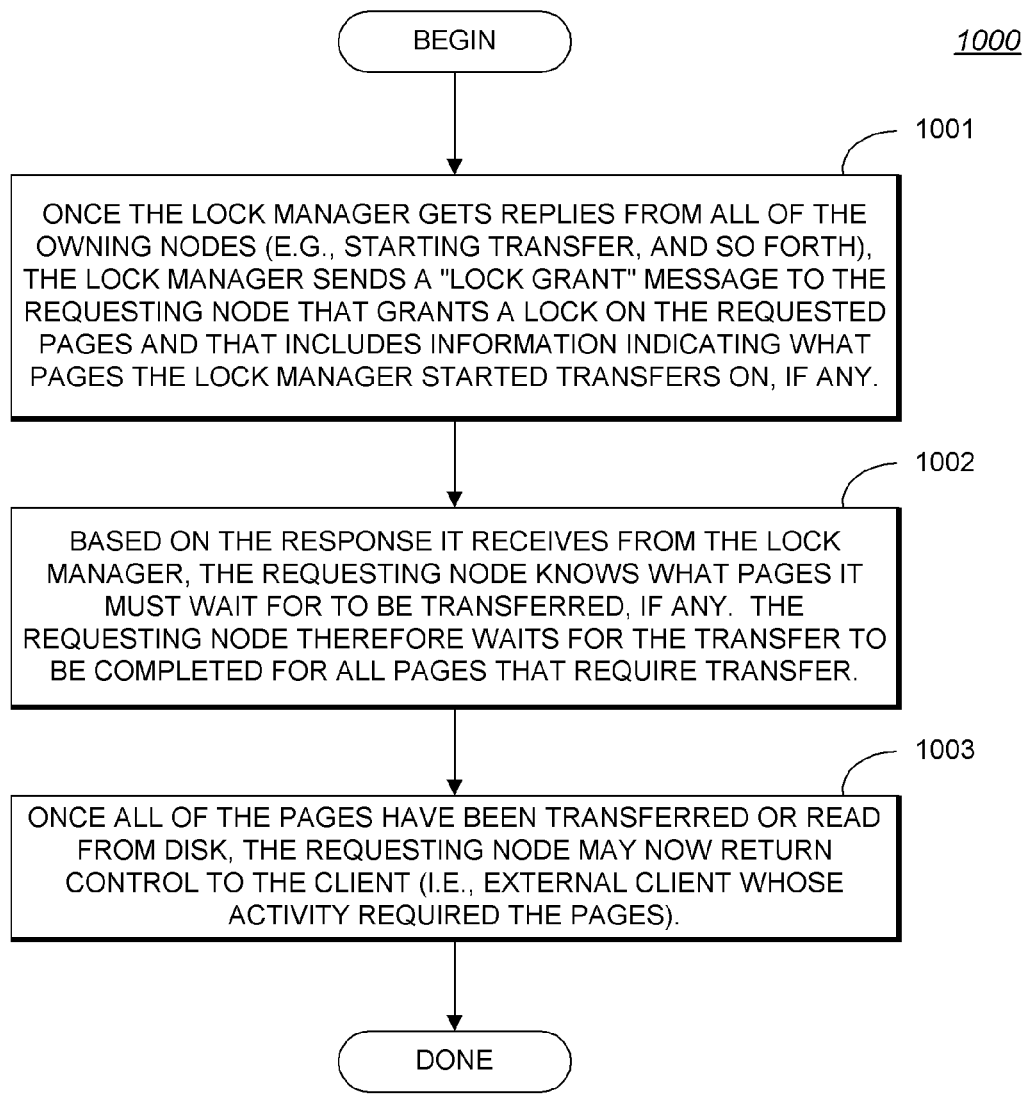
FIG. 10 is a flowchart illustrating the final operations involving the requesting node.

FIG. 10 is a flowchart illustrating the final operations involving the requesting node. Once the lock manager gets replies from all of the owning nodes (e.g., starting transfer, and so forth), the lock manager sends a "lock grant" message to the requesting node that grants a lock on the requested pages and includes information indicating what pages the lock manager has started transfers on, if any, as indicated at step 1001. Now, based on the response it receives from the lock manager, the requesting node knows what pages it must wait for to be transferred, if any. Therefore, at step 1002, the requesting node waits for the transfer to be completed for all pages that require transfer, if any. However, the lock manager may alternatively instruct the requesting node to read pages from disk (e.g., scenario where the pages were not all present in the cluster), as indicated at step 1003. The actual instruction to read from disk is piggybacked on the lock grant message transmitted from the lock manager to the requesting node. Once all of the pages have been transferred or read from disk, the requesting node may now return control to the client (i.e., external client whose activity required the pages), as indicated at step 1004.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a distributed shared disk cluster environment comprising a plurality of nodes, each node storing database pages in different size buffer pools configured for local access and configured independent from other nodes in the cluster, the database pages residing at any buffer pool across nodes without requiring that a page be present at an identical buffer pool at all nodes in the cluster, a method for transferring database pages among nodes comprising:

generating a request at a first node for a set of database pages, the request including a timestamp for determining by a lock manager what are latest versions of the database pages, wherein the lock manager centrally stores timestamp information from all nodes of the cluster;

in response to the request, determining by said lock manager where latest versions of the database pages of the set reside among the plurality of nodes without regard to what size of buffer pool any given database page may reside in, wherein determining by said lock manager includes evaluating the timestamp received from the first node to determine if the first node has the latest versions of the database pages;

if the database pages of the set reside among the plurality of nodes, initiating transfer of particular database pages to the first node as required for providing the first node with the latest versions of the database pages; and, otherwise if the database pages of the set do not reside among the plurality of nodes, instructing the first node to fetch the database pages from disk.

2. The method of claim 1, wherein said database pages comprise database index pages.

3. The method of claim 1, wherein said database pages comprise database table pages.

4. The method of claim 1, wherein said request comprises a request for a contiguous block of database pages.

5. The method of claim 1, wherein said request comprises a starting page number and a number of pages, for specifying a set of database pages.

6. The method of claim 1, further comprising:
in response to the request, selecting a buffer pool at the first node for receiving the set of database pages.

7. The method of claim 6, wherein said initiating transfer step includes: transferring a direct memory access (DMA) key, so that database pages may be transferred directly to the selected buffer pool at the first node.

8. The method of claim 1, further comprising:
in response to the request, determining whether some of the database pages of the set already reside at the first node.

9. The method of claim 8, further comprising:
if the latest version of one or more of the database pages of the set already reside at the first node, downgrading the request so that the request no longer includes database pages residing at the first node.

10. The method of claim 1, wherein said request includes a lock request for the set of database pages.

11. The method of claim 1, wherein said determining step includes:
based on the timestamp, determining by a lock manager which database pages of the set are required to be transferred to the first node, in order to satisfy the request.

12. The method of claim 11, wherein the lock manager specifies that a database page should be transferred from a given remote node, when a corresponding timestamp for the database page at the given remote node has advanced relative to the timestamp of the first node.

13. The method of claim 1, wherein a lock manager instructs the first node to fetch the database pages from disk in a single read operation, when the database pages of the set do not reside among the plurality of nodes.

14. A computer-readable medium having processor-executable instructions for performing the method of claim 1.

15. A distributed shared disk cluster system comprising:
a plurality of nodes in the cluster, each node storing database pages in different size buffer pools configured for local access and configured independent from other nodes in the cluster, the database pages residing at any buffer pool across nodes without requiring that a page be present at an identical buffer pool at all nodes in the cluster;
a first node in the cluster that generates a request for a set of database pages, the request including a timestamp for determining what are latest versions of the database pages; and
a lock manager centrally storing timestamp information from all nodes of the cluster that, responsive to said request, that determines where latest versions of the database pages of the set reside among the plurality of nodes including evaluating the timestamp received from the first node to determine if the first node has the latest versions of the database pages, without regard to what size of buffer pool any given database page may reside, and which initiates transfer of particular database pages to the first node as follows:
if the database pages of the set reside among the plurality of nodes, initiating transfer of particular database pages to the first node as required for providing the first node with the latest versions of the database pages; and, otherwise
if the database pages of the set do not reside among the plurality of nodes, instructing the first node to fetch the database pages from disk.

16. The system of claim 15, wherein said database pages comprise database index pages.

17. The system of claim 15, wherein said database pages comprise database table pages.

18. The system of claim 15, wherein said request comprises a request for a contiguous block of database pages.

19. The system of claim 15, wherein said request comprises a starting page number and a number of pages, for specifying a set of database pages.

20. The system of claim 15, wherein the first node selects a local buffer pool at the first node for receiving the set of database pages.

21. The system of claim 20, wherein database pages may be transferred directly to the selected buffer pool at the first node using a direct memory access (DMA) key.

22. The system of claim 15, further comprising:
program logic for determining whether some of the database pages of the set already reside at the first node.

23. The system of claim 22, wherein the lock manager downgrades the request when the latest version of one or more of the database pages already resides at the first node.

24. The system of claim 15, wherein said request includes a lock request for the set of database pages.

25. The system of claim 15, wherein the lock manager determines based on the timestamp which database pages of the set are required to be transferred to the first node, in order to satisfy the request.

26. The system of claim 25, wherein the lock manager specifies that a database page should be transferred from a given remote node, when a corresponding timestamp for the database page at the given remote node has advanced relative to the timestamp of the first node.

27. The system of claim 15, wherein the lock manager instructs the first node to fetch the database pages from disk in a single read operation, when the database pages of the set do not already reside among the plurality of nodes.

28. The system of claim 15, wherein database pages are transferred to the first node asynchronously.

29. In a distributed database environment comprising a database system utilizing a shared disk cluster, an improved method for transferring database information, the method comprising:
storing the database information among a plurality of nodes in the cluster, each node storing particular database information as database pages in different size buffer pools configured for local access and configured independent from other nodes in the cluster;
receiving a request from a requesting node for a set of database pages, the request including a timestamp for determining by a lock manager what are latest versions of the database pages, wherein the lock manager centrally stores timestamp information from all nodes in the cluster;
in response to the request, determining by said lock manager which nodes own latest versions of the database pages of the set among the plurality of nodes without regard to what size of buffer pool any given database page may reside, wherein determining by said lock manager includes evaluating the timestamp received from the requesting node to determine if the requesting node has the latest versions of the database pages;
if all of the database pages of the set are owned by nodes, transferring to the requesting node any database pages required for providing the requesting node with the latest versions; and, otherwise
if the database pages of the set are not owned by the nodes, instructing the requesting node to fetch the database pages from disk.

30. The method of claim 29, wherein said database pages comprise database index pages.

31. The method of claim 29, wherein said database pages comprise database table pages.

32. The method of claim 29, wherein said request comprises a request for a contiguous block of database pages.

33. The method of claim 29, wherein said request comprises a starting page number and a number of pages, for specifying a set of database pages.

34. The method of claim 29, further comprising:
in response to the request, selecting a buffer pool at the requesting node for receiving the set of database pages.

35. The method of claim 34, wherein said transferring step includes:
transferring a direct memory access (DMA) key, so that database pages may be transferred directly to the selected buffer pool at the requesting node.

36. The method of claim 29, further comprising:
in response to the request, determining whether some of the database pages of the set already reside at the requesting node.

37. The method of claim 36, further comprising:
resizing the request according to the availability of the buffer pools at the requesting node, and if the latest version of one or more of the database pages of the set already reside at the requesting node, resizing the request so that the request no longer includes database pages residing at the requesting node.

38. The method of claim 29, wherein said request includes a lock request for the set of database pages.

39. The method of claim 29, wherein said determining step includes:
  based on the timestamp, determining by a lock manager which database pages of the set are required to be transferred to the requesting node, in order to satisfy the request.

40. The method of claim 39, wherein the lock manager specifies that a
  particular database page should be transferred from a given node that owns the particular database page, when a corresponding timestamp for the particular database page at the given node has advanced relative to the timestamp of the requesting node.

41. The method of claim 29, wherein a lock manager instructs the requesting node to fetch the database pages from disk in a single read operation, when the database pages of the set do not reside among the plurality of nodes.

42. The method of claim 29, further comprising:
  storing on a computer-readable medium processor-executable instructions for performing the method of claim 29.

* * * * *